United States Patent [19]

Häberli et al.

[11] 3,967,921
[45] July 6, 1976

[54] SOLID, NON-DUSTY DYESTUFF-FOAMS OF ANY DESIRED SHAPE AND SIZE

[75] Inventors: Roland Häberli, Wurenlingen; Hans Mollet, Reinach, both of Switzerland

[73] Assignee: Ciba-Geigy Corporation, Ardsley, N.Y.

[22] Filed: July 9, 1973

[21] Appl. No.: 377,882

[30] Foreign Application Priority Data
Aug. 1, 1972    Switzerland...................... 11385/72

[52] U.S. Cl............................................ 8/93; 8/79; 252/307; 252/350
[51] Int. Cl.² ........................................ C09B 67/00
[58] Field of Search .......... 8/79, 93, 1 W; 252/307, 252/350; 260/2.5 P

[56]     References Cited
UNITED STATES PATENTS

| | | | |
|---|---|---|---|
| 1,659,131 | 6/1925 | Bishop et al. | 173/158 |
| 1,948,568 | 2/1934 | Faber et al. | 8/149.1 |
| 2,716,961 | 9/1955 | Manheim | 8/4 |
| 2,949,426 | 5/1957 | Thiegs | 252/307 |
| 2,971,458 | 2/1961 | Kumins | 8/62 |
| 3,048,464 | 4/1959 | Fisher | 8/79 |
| 3,263,012 | 7/1966 | Nadler | 8/79 |
| 3,492,093 | 1/1970 | Start | 252/307 |
| 3,723,340 | 3/1973 | Shepherd | 252/307 |

FOREIGN PATENTS OR APPLICATIONS 1,134,221   11/1968   United Kingdom

*Primary Examiner*—Samuel W. Engle
*Assistant Examiner*—Ralph Palo
*Attorney, Agent, or Firm*—Joseph G. Kolodny; Edward McC. Roberts; Prabodh I. Almaula

[57]     ABSTRACT

Solid non-dusty, porous dyestuff-foams are described of any desired shape and size containing at least one dyestuff, a foaming agent and optionally bonding agents and/or further additives.

These foams are useful for preparing dye liquors or printing pastes by sprinkling said foams into water or organic solvents.

5 Claims, No Drawings

SOLID, NON-DUSTY DYESTUFF-FOAMS OF ANY DESIRED SHAPE AND SIZE

The present invention relates to solid, non-dusty dyestuff-foams of any desired shape and size which represent a new commercial form of dyestuffs, decomposing spontaneously or dissolving rapidly in the dyeing medium; to process for the production thereof; and to the use of the new solid and non-dusty dyestuff-foams for the preparation of aqueous or organic dye liquors or printing pastes.

It is known that many of the commerical dyestuff powders are unpleasant to handle on account of the creation of dust occurring on weighing out and during transference to the dye liquors, inadequate wettability, lumpiness and slowness in dissolving, even in warm water. It has therefore already been suggested that nondusty dyestuff preparations be obtained, e.g., by additions of small amounts of anti-dust agents, wetting agents, solubility-promoting agents, salts, etc., e.g., mineral oils, sulphonated oils, polar organic solvents, especially hygroscopic compounds such as glycols or glycerin, tri-sodium phosphate or tripotassium phosphate; or by conversion by means of spray drying, if necessary in the presence of water-soluble adhesives, into a microgranular form. However, dust-free preparaions are not obtained as a result of either the stated additives or the spray-dried products. Moreover, the last-mentioned have in most cases an appreciable bulk volume, are inhomogeneous in particle-size and, depending on degree of fineness, poorly wettable.

Attempts have also been made to convert dyestuffs, by grinding in the presence of a dispersing agent, a basic carbonate or bicarbonate compound and a solid acid, into a form soluble in cold water, or by compacting in special apparatus into the form of tablets or briquettes. These products too, however, exhibit in some cases insufficient cohesion, disintegrate with the release of dust during prolonged storage or under mechanical stressing and require stirring devices and, with exception of the cold-water-soluble preparations, warm water before going into solution. Moreover, the dyestuffs of the preparations possess in many cases properties differing from those of the original dyestuffs, e.g., poorer solubility in water, tendency to form lumps, etc. These disadvantages become unpleasantly noticeable particularly in the further utilisation of the dyestuff preparations for the production of dye liquors in which good and rapid solubility or dispersion of the dyestuffs in aqueous or organic media and the maintenance of specific dyestuff concentrations are important.

It has now been found that it is possible to process dyestuffs, with avoidance of the stated disadvantages, into solid, non-dusty and dimensionally stable dyestuff-foams which, by virtue of their porous structure, rapidly wet on being added to the cold or warm dye liquor and, without stirring or heating, spontaneously disintegrate or dissolve therein, the said dyestuff-foams being of any desired shape and having a particle-size of at least 0.1 mm. These solid, non-dusty dyestuff-foams contain at least one dyestuff, a foaming agent and, optionally, bonding agents and/or further additives.

These new dyestuff-foams preferably contain 10 to 99 percent by weight of at least one dyestuff, 0.1 to 20 percent by weight of a foaming agent, 0 to 80 percent by weight of a bonding agent and 0 to 80 percent by weight of further additives.

Dyestuffs applicable according to the invention are the same organic dyestuffs as are normally used in the textile industry for the dyeing or printing of textiles, particularly textile fibers, from an aqueous or organic liquor or with printing paste. Depending on the substrate to be dyed, the dyestuffs concerned are water-soluble, anionic or cationic dyestuffs, or water-dispersible dyestuffs.

Furthermore leather dyestuffs and paper dyestuffs can be used.

The water-soluble anionic dyestuffs can belong to the most deverse classes of dyestuffs. These are, in particular, mono-, dis- or polyazo dyestuffs, formazan, anthraquinone or phthalocyanine dyestuffs, which can be metal-free or can contain metal bound in complex linkage. Particularly suitable are the alkali or amonium salts of the so-called acid wool dyestuffs, of the reactive dyestuffs, such as, e.g., those with a 2,4-dichloropyrimid-6-yl group, a 2,4-dichloro-1,3,5-triazin-6-yl group or an $\alpha$-bromoacryloyl group, or of the substantive cotton dyestuffs of the azo, anthraquinone and phthalocyanine series, such as also sulphur and vat dyestuffs.

Applicable water-soluble cationic dyestuffs are the usual salts and metal halides, for example, zinc chloride double salts of the known cationic dyestuffs, particularly of the methine, azamethine or azo dyestuffs. Also suitable are cationic dyestuffs of the diphenylmethane, triphenylmethane, oxazine and thiazine series, as well as, finally, dye salts of the arylazo and anthraquinone series having an external ammonium group, e.g., an external cyclammonium group or alkylammonium group.

In the case of the dispersion dyestuffs usable according to the invention, these are, in particular, azo dyestuffs, as well as anthraquinone, nitro, methine, styryl, azastyryl, naphthoperinone, quinophthalone or naphthoquinonimine dyestuffs.

By dyestuffs are also meant optical brighteners. As optical brighteners, it is possible to use, e.g., any normally applied colorless stilbene dyestuff.

The mentioned dyestuffs can be used in the form in which they are obtained in production, or diluted with diluting and/or dispersing agents, singly or in admixture with each other.

Suitable foaming agents applicable according to the invention are interface-active substances which have a certain film-forming capacity and which thus promote the formation of foam in liquids. The foaming agent is advantageously an anionic or non-ionic compound; it can, however, also be a cationic or amphoteric agent. With ionic dyestuffs it is usual to use preferably foaming agents of a similar or neutral ionic nature, i.e., with anionic dyestuffs there are used anionic, amphoteric or non-ionic foaming agents.

Suitable anionic foaming agents include aliphatic and/or aromatic carboxylic and sulphonic acids, their esters and amides and aliphatic or araliphatic sulphates, phosphates and borates; particularly alkane-, alkylbenzene- and alkylnaphthalene-sulphonates, primary or secondary alkylsuphates, the alkylpolyglycol ether-, alkylphenylpolyglycol ether- and dialkylphenylpolyglycol ethersulphates of which the alkyl radicals preferably contain 8 to 20 carbon atoms, sulphonated or sulphated oils, fatty acid taurides and fatty acid sulphatoethyl amides, such as, e.g. butylsulphonate, dodecylbenzenesulphonate, dibutylnaphthalenesulphonate, lauryl alcohol triglycol ether sulphate, nonylphenylpentaglycol ether sulphate, sulphonated castor oil or dioctylsulphosuccinate.

Suitable non-ionic foaming agents are water-soluble condensation products, such as polyvinyl alcohol, or adducts obtained by reaction of 8 to 100 moles of ethylene oxide with a fatty alcohol, a fatty acid, a fatty acid amide, or an alkylphenol such as nonyl-, decyl- or undecylphenol. To be particularly mentioned are stearylpentacosaglycol ether, and adduct from 25 moles of ethylene oxide and 1 mole of castor oil, an adduct from 90 moles of ethylene oxide and 1 mole of 3-stearylaminopropylamine, octylphenyldecaglycol ether or nonylphenylpentadecaglycol ether. Also alkanolamides of fatty acids, such as mono- or diethanolamides of lauric, myristic or coconut oil fatty acids or their ethylene oxide adducts.

Suitable cationic foaming agents are the adducts obtained by reaction of 8 to 100 moles of ethylene oxide and a fatty alkylamine or a fatty alkylpolyamine and their quaternated derivatives, such as, e.g., the condensation product from 4 moles of benzly chloride with 1 mole of ethylenediamine, quaternated with 2 moles of dimethylsulphate.

Amphoteric foaming agents which may be mentioned are: fatty acid sulphatoethylaminoethylamides, fatty acid-$\gamma$-sulpho-$\beta$-hydroxypropylaminoethylamides, the mono- or disulphated adducts from 8 to 100 moles of ethylene oxide and a fatty alkylamine or fatty alkylpolyamine.

In addition to the dyestuffs and foaming agents, the dyestuff foams according to the invention can contain one or more bonding agents, particularly foam stabilizers and/or further additives.

Suitable foam stabilizers are, e.g., polyvinyl alcohol, cellulose derivatives such as carboxymethylcellulose, sulphoxides of the formula R—SO—R' wherein R represents an alkyl radical having 8 to 18 carbon atoms and R' an alkyl radical having 1 to 4 carbon atoms, monoglycerides of fatty acids such as of lauric acid or oleic acid.

Some compounds, such as, e.g., polyvinyl alcohols, advantageously such one having a mean degree of hydrolysis of 98.4 – 81.5 and a viscosity at 20° of a 4% aqueous solution of 4 to 60 centipoise, can exercise a double function in the preparations according to the invention in that they act both as foaming agents and as foam stabilizers. They thus belong to the preferred compounds.

Suitable bonding agents are natural or synthetic substances soluble in water or in an organic solvent, such as dextrin, starch, gelatine, alginates, lignin sulphonates, polyacrylates, polyacrylamides, polyvinylpyrrolidone or water glass.

Further suitable additives that may be mentioned are foam-improving agents, fillers, wetting agents or solubility-promoting agents.

The solid dyestuff-foams can be produced by mechanical or chemical means.

To produce the foam by mechanical means, a gas is blown into the liquid mass to be foamed, or foam is created by vigorous kneading or stirring of the liquid mass in the appropriate gas atmosphere, with the provision that the liquid contains suitable foaming agents.

For example, air or an inert gas is stirred, beaten or blown into an aqueous slurry containing the dyestuff, the foaming agent and optionally the bonding agent, as well as further additives, with intensive stirring or kneading in a conventional mixing and kneading apparatus, e.g., in a planetary mixer or paste-kneader, until a very fine and stable foam has been formed. Suitable inert gases are, e.g., nitrogen or carbon dioxide; however, air is advantageously employed in most cases.

It is advantageous if the dyestuff is used in the form of a moist press cake and not in dried powder form.

For stabilization of the foam, it is preferable in most cases to add to the dyestuff-mass a bonding agent, particularly a foam stabilizer, because an adequate strength is required of the formed foam structure after drying, this applying in particular where certain shapes of appreciable dimensions have to be formed from the foam. In this case, the dyestuff-foam is charged in a known manner into the appropriate moulds and shaped into balls, cylinders, lamella, flakes or into other such forms. The drying of the dyestuff-foam is performed, e.g., in a drying oven, at a temperature of about 50° to 200°C. THe foaming operation can however also be carried out by the blowing under pressure of air, or of one of the other inert gases mentioned above, into the viscous mass and the application then of a vacuum, so that the gas expands and forms fine bubbles. It is however also possible to effect foaming by means of readily volatile liquids which form pores as they pass from the liquid into the gaseous state. Suitable liquids for this purpose are, e.g.: aliphatic and halogenated hydrocarbons such as pentane, hexane, isohexane, heptane, dichloroethane and trichloromonofluoromethane. These liquids are stirred into the aqueous, thickly liquid and viscous slurry containing the dyestuff and the foaming agent, and the suspension or slurry subsequently heated, advantageously to 40° to 70°C, and, after the formation of foam, finally dried.

The creation of foam can also be effected by chemical means. The substances which decompose on heating or as a result of pH changes with the release of gas are mixed advantageously with the thickly liquid and viscous aqueous dyestuff suspension in such a manner that no gas escapes; the dyestuff suspension is heated to 40° to 150°C and, after the formation of foam, shaped and dried. Suitable substances decomposing with the release of gas are, e.g., ammonium carbonate, alkali carbonate such as sodium bicarbonate, or diazoacetic acid esters and acids, isocyanates, azo compounds such as azobisisobutyronitrile or diazoaminobenzene, N-nitroso compounds such as N,N'-dinitrosopentamethylenetetramine, or sulphonylhydrazides such as toluene-(4)-sulphohydrazide or hexamethylenetetramine.

There are thus obtained solid, non-dusty, porous dyestuff-foams which may optionally be subsequently reduced in a mill. They possess a very favourable low bulk volume. It is possible by means of a simple sprinkling of the dyestuff-foams according to the invention into water or into organic solutions to produce in an extremely simple manner, and with avoidance of the aforementioned difficulties, dye liquors or printing pastes for the dyeing or printing of the widest range of textiles.

The following examples illustrate the invention without the scope of this being limited in any way to the given examples.

EXAMPLE 1

300 g of the dyestuff of the formula

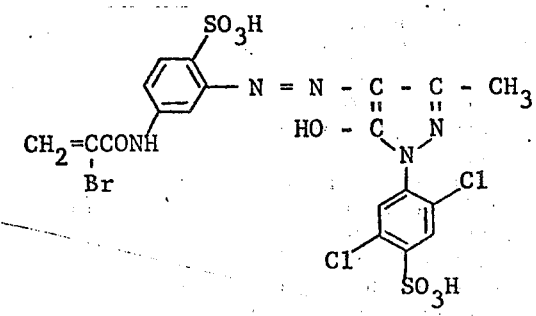

300 g of water and 1 g of sodium dibutylnaphthalene-sulphonate are stirred together and, as air is blown in, intensively kneaded for 15 minutes; there is formed in this way a porous, readily drying dyestuff mass, which is then poured onto a metal sheet and dried at 50°C in a drying oven. There is obtained after drying a solid, porous, mortar-like, dust-free dyestuff-foam consisting of 99.7 percent by weight of dyestuff and 0.3 percent by weight of sodium dibutylnaphthalenesulphonate, which can be easily reduced in size.

On addition of this solid dyestuff-foam to cold or warm water, the dyestuff-foam sinks immediately and disintegrates instantaneously to become completely dissolved.

EXAMPLE 2

230 g of the commercial dyestuff of the formula according to Example 1, 30 g of water-soluble starch and 100 g of an aqueous 25% polyvinyl alcohol solution are placed into a kneading apparatus, and the mixture, after the addition of 150 ml of water, kneaded for 15 minutes with the simultaneous stirring in of air to thus obtain a frothy dyestuff mass. As soon as the density of the foam is ca. 0.91 g/cm$^3$, the dyestuff mass is poured into moulds and dried at 50°C in a drying oven.

There is obtained in this manner a solid, yellow, dust-free dyestuff-foam consisting of 80.5 percent by weight of dyestuff, 10.5 percent by weight of starch and 9 percent by weight of polyvinyl alcohol in the form of balls, cylinders or tablets, which rapidly dissolve without difficulty in cold or warm water.

EXAMPLE 3

200 g of the dry undiluted dyestuff of the formula according to Example 1, 30 g of water-soluble starch and 80 g of a 25% aqueous polyvinyl alcohol solution are placed into a kneading apparatus. Air is kneaded into this paste for 30 minutes with the gradual addition of 225 ml of water. There is obtained a frothy dyestuff mass, which is then filled into moulds and subsequently dried at 50°C in a drying oven. There results a shaped, solid, yellow, dust-free dyestuff-foam consisting of 72 percent by weight of dyestuff, 20 percent by weight of water-soluble starch and 8 percent by weight of polyvinyl alcohol, which instantly decomposes on being added to cold or warm water, and rapidly dissolves therein without stirring being required.

If nitrogen or some other inert gas is kneaded into this mixture instead of air, with otherwise the same procedure as described in the example, then there likewise results a solid yellow dyestuff foam having equally good solubility properties.

EXAMPLE 4

170 g of the undiluted dyestuff of the formula

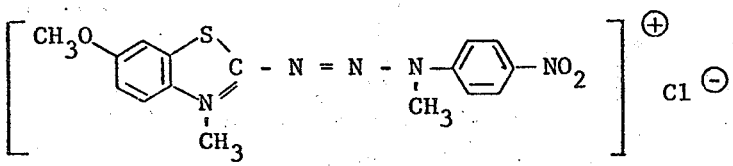

10 g of water-soluble starch and 80 g of an aqueous 25% polyvinyl alcohol solution are placed into a kneading apparatus; air is then kneaded into the viscous mass during the course of 15 minutes, with the simultaneous addition of 125 ml of water. There is obtained a frothy dyestuff mass, which is poured onto a metal sheet and dried at 50°C in a drying oven. There results from this process a solid, porous, yellow, dust-free dyestuff-foam consisting of 85 percent by weight of dyestuff, 5 percent by weight of starch and 10 percent by weight of polyvinyl alcohol, which has an excellent solubility in cold or warm water.

EXAMPLE 5

200 g of the undiluted dyestuff of the formula

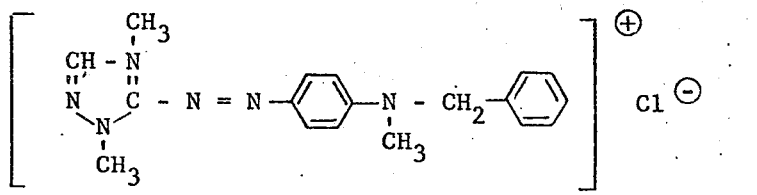

15 g of water-soluble starch and 100 g of an aqueous 25% polyvinyl alcohol solution are placed into a kneading apparatus; air is then kneaded for 15 minutes into this mixture, with the simultaneous addition of 100 ml of water. There results a frothy dyestuff mass which is poured onto a metal sheet and dried at 50°C in a drying oven. There is thus obtained a dust-free, solid, red dyestuff-foam consisting of 85 percent by weight of dyestuff, 6.5 percent by weight of water-soluble starch and 8.5 percent by weight of polyvinyl alcohol, which possesses an excellent solubility in cold or warm water.

If there are used, instead of the water-soluble starch, the bonding agents listed in the following table, column III, and instead of polyvinyl alcohol the foaming agents given in column II, the procedure otherwise being as described in the example, then red dyestuff foams having equally good solubility properties are obtained.

TABLE

| Example No. | Foaming agent | Bonding agent |
|---|---|---|
| 6 | sodium dibutylsulphonate | carboxymethylcellulose |
| 7 | " | water-soluble starch |
| 8 | " | polyvinylpyrrolidone |
| 9 | dodecylbenzenesulphonate | polyacrylic acid |
| 10 | nonylphenyldecaglycol ether | polyacrylamide |
| 11 | sodium dibutylsulphonate | water-soluble starch |
| 12 | polyvinyl alcohol | carboxymethylcellulose |
| 13 | " | water-soluble starch |
| 14 | " | polyacrylamide |

EXAMPLE 15

There is kneaded a mixture consisting of a dyestuff press cake containing 200 g of the dyestuff of the formula

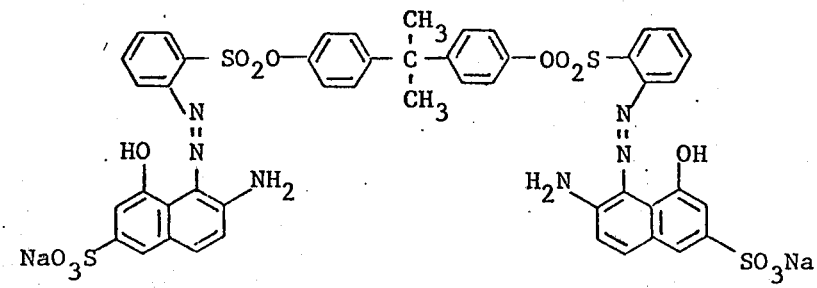

15 g of water-soluble starch, 100 g of an aqueous 25% polyvinyl alcohol solution and 10 g of ammonium bicarbonate, with the gradual additon of 100 ml of water for 15 minutes. The pasty mass is simultaneously heated to ca. 50°C, whereby it gradually expands to form a frothy mass. After drying at 50° to 60°C, there is obtained a solid, porous, red dyestuff-foam consisting of 83 percent by weight of dyestuff, 6.5 percent by weight of starch and 10.5 percent by weight of polyvinyl alcohol, which, on being placed into cold or warm water, immediately dissolves.

If corresponding amounts of hexamethylenetetramine are used instead of ammonium bicarbonate, with otherwise the same procedure as described in the example, then there is obtained a red solid dyestuff-foam possessing equally good solubility properties.

We claim:

1. A solid foam dyestuff composition, comprising 10 to 99% by weight of a dyestuff, 0.1 to 20% by weight of a foaming agent, and up to 80% by weight of a bonding agent selected from the group consisting of dextrin, starch, gelatin, alginates, lignin sulphonates, polyacrylates, polyacrylamides, polyvinylpyrrolidone, and water glass, wherein all components of the composition are readily soluble in water.

2. The composition of claim 1, wherein the foaming agent is polyvinyl alcohol.

3. A process for the production of a solid foam dyestuff composition, comprising the steps of dispersing 10 to 99% by weight of a water-soluble dyestuff in water together with 0.1 to 20% by weight of a water-soluble foaming agent and up to 80% by weight of a water-soluble bonding agent selected from the group consisting of dextrin, starch, gelatin, alginates, lignin sulfonates, polyacrylates, polyacrylamides, polyvinylpyrrolidone and water glass, subsequently bubbling an inert gas through the aqueous dispersion to produce a foam, and finally drying the resultant foam.

4. The process of claim 3, wherein the inert gas is provided in situ by heating a readily volatile liquid.

5. The process of claim 3, wherein the inert gas is provided in situ from a compound which decomposes with increased temperature or with change of pH to release the inert gas.

* * * * *